United States Patent Office 3,346,675
Patented Oct. 10, 1967

3,346,675
METHOD OF PREPARING SMALL PARTICLE NITROCELLULOSE
John J. Sapiego, New Brunswick, N.J., assignor to Hercules Incorporated, Wilmington, Del., a corporation of Delaware
No Drawing. Filed Sept. 8, 1966, Ser. No. 577,821
7 Claims. (Cl. 264—3)

ABSTRACT OF THE DISCLOSURE

Fibrous nitrocellulose is densified by means of an active solvent in an amount sufficient to soften the fibers without disolving the same. The densification is effected in aqueous medium under the influence of high shear agitation at about 30 to 50° C. The process results in a controlled agglomeration of the resultant particles to a preselected particle size. Optionally a protective colloid can be added at the optimum point to enhance control over ultimate particle size.

This invention relates to densified nitrocellulose particles suitable for use in a wide variety of applications and to a process for preparing the same.

Several processes have been disclosed for converting nitrocellulose from the fibrous form in which it has traditionally been supplied into a densified, free-flowing, hard particle form which is considerably easier to handle. In one such process, described by Grassie in U.S. 2,948,601, the fibrous particles are suspended in water, agitated at about 1000 r.p.m., and contacted with an active nitrocellulose solvent at the temperature at which the solvent forms a minimum boiling azeotrope with the suspending water, in an amount sufficient to soften but not dissolve the nitrocellulose and then the active solvent is removed by azeotropic distillation. This process results in formation of smooth, hard, dense, irregularly shaped particles roughly 1/16 to 1/4 inch in their greatest dimension, having a bulk density of about 44 lbs. per cu. foot. It has been found however, that for many applications it is desirable to have smaller particles of more regular shape than are produced by the process taught by Grassie.

It has now been determined that, by the establishment of certain critical conditions during the densification step, regularly shaped, densified particles of about 50 to 1000 microns in their largest dimension can be prepared. Thus, the densification according to this invention is carried out with particular regard for the rate and type of agitation, the temperature during the solvent addition, and the application of protective colloids. By controlling these variables as hereinafter described it is possible to direct the densification in the desired direction to form particles of the size desired for a particular application.

In a preferred embodiment, the process of the invention comprises forming a slurry of fibrous nitrocellulose in water under the influence of high speed, shear agitation at a temperature of about 20 to 50° C., adding thereto a nitrocellulose solvent, which, with water, forms an azeotrope having an atmospheric boiling point above about 50° C. in an amount sufficient to soften and swell the nitrocellulose but insufficient to dissolve the same, thereafter progressively heating the slurry to the temperature at which the nitrocellulose solvent forms an azeotrope with water, and boiling off the nitrocellulose solvent while continuing the high shear agitation. Optionally, a water-soluble protective colloid can be added after at least about one quarter of the nitrocellulose solvent has been added.

To illustrate the invention, the following illustrative examples are presented in which parts and percentages are by weight.

Example 1

A slurry was prepared consisting of 220 parts nitrocellulose (13.4% $N_2$) dry basis, and 1900 parts water. This slurry was subjected to agitation with, alternatively, a standard paddle-type agitator and a Cowles high shear agitator (Moorehead-Cowles Co.). The slurry was heated to about 50° C. and 105 parts of methyl isobutyl ketone was added over a period of about 2 minutes. Methyl cellulose, in the amount of 0.1% based on the whole mass was added, followed by 313 additional parts of the methyl isobutyl ketone, added over about 7 minutes. The temperature was then increased to boil off the solvent; when all solvent was removed, the temperature rose to 100° C. where it was held for about ½ hour. Agitation was continued until completion of the run.

Successive runs were made using both the paddle-type and the Cowles high shear agitator, the speed of agitation being varied between 1000 r.p.m. and 3000 r.p.m. The effect on the size, shape and size distribution of the resulting particles is shown in the following tabulation. The letter designations under the "Shape" column give an indication of the shape regularity, E is excellent, G is good, and P is poor.

| Agitator Speed (r.p.m.) | Particle Size (Microns) | | | | | |
|---|---|---|---|---|---|---|
| | Shear Agitation | | | Paddle Agitation | | |
| | Range | Majority | Shape | Range | Majority | Shape |
| 1,000 | 200–900 | 400–700 | P | 200–2000 | | P |
| 3,000 | 150–450 | 170–300 | E | 150–650 | 200–400 | G |

Example 1–A

The procedure substantially according to Example 1 was repeated using a Kady high shear agitator operating at 15,000 r.p.m. Particles of good shape uniformity having an overall size range of 15 to 100 microns, majority 30 to 60 microns, were produced.

Example 2

A slurry was prepared consisting of 220 parts by weight (dry basis) of fibrous nitrocellulose and 1900 parts water. This was subjected to high shear agitation with a Cowles agitator at about 3000 r.p.m. Successive tests were performed at 30, 50 and 80° C. respectively.

With the temperature stabilized at the specified point, 418 parts of methyl isobutyl ketone was added over a period of about nine minutes. After all the solvent had been added, the temperature was raised to the boiling point of the water-solvent azeotrope to remove the solvent. When the temperature had risen to 100° C. it was held at that point for thirty minutes.

The size and range of sizes of the particles recovered are indicated in the following tabulation:

| Temp., °C. | Particle Size | | Shape |
| --- | --- | --- | --- |
| | Overall Range | Majority | |
| 30 | 170–550 | 170–325 | Spherical—Excellent Uniformity. |
| 50 | 200–650 | 350–450 | Spherical—Good Uniformity. |
| 80 | 250–650 | 250–400 | Spherical—Fair Uniformity. |

*Example 3*

The procedure of Example 2 was repeated except that in each case, after addition of 105 parts of the nitrocellulose solvent, 2.6 parts of methyl cellulose was added and allowed to disperse throughout the mass, whereupon the remainder of the MIBK was added. The size and range of the particles recovered from these runs are indicated in the following table:

| Temp., °C. | Particle Size | | Shape |
| --- | --- | --- | --- |
| | Overall Range | Majority Range | |
| 30 | 30–250 | 50–75 | Spherical—Fair Uniformity. |
| 50 | 150–450 | 170–300 | Spherical—Excellent Uniformity. |
| 80 | 200–850 | 200–500 | Spherical—Fair Uniformity. |

*Example 4*

Two hundred and twenty (220) parts by weight of nitrocellulose (dry basis) was slurried in 1900 parts water with the aid of high shear Cowles agitation. The temperature was stabilized at about 50° C. To study the effect of the addition of the protective colloid to the system, successive tests were conducted wherein the point of addition of the colloid with respect to the nitrocellulose solvent, methyl isobutyl ketone, was varied. The colloid used was methyl cellulose and was added in the amount of 0.1% of the total weight of the slurry, i.e., 2.6 parts by weight. The data listed in the test below show particle size and range for tests where (a) no colloid was added, (b) colloid added before any solvent, (c) after ¼ of the solvent, (d) after ½ of the solvent and (e) after ¾ of the solvent. The designation under the "Shape" column indicates the shape regularity, where F=fair, G=good, and E=excellent.

| Point of Addition | Overall Range | Majority Range | Shape |
| --- | --- | --- | --- |
| Before | 30–200 | 50–75 | F |
| After ¼ | 150–450 | 170–300 | E |
| After ½ | 125–650 | 200–400 | G |
| After ¾ | 100–650 | 250–400 | G |
| None | 200–650 | 350–450 | G |

The product resulting from the process of this invention can be used in any application where nitrocellulose is normally used. For example, the product prepared according to Example 1A is useful in preparing suspension-type wood fillers. Other applications include plastics, adhesives, lacquer and other types of coatings and rocket propellants, for example. Thus, the process is applicable to any of the commercially available nitrocellulose varieties. This includes those having about 10.8 to 13.4% $N_2$.

One particularly useful application, and a preferred one, is in the manufacture of smokeless powder suitable for loading small arms ammunition. Products of size, size uniformity and density particularly desirable for smokeless powder can readily be prepared using this process. More specifically, for smokeless powder applications, particles within the range about 100 to 1000 microns, preferably 100 to 500 microns, are most desirable, with the smallest possible range of particle size, and bulk density of about 30 to 50 lbs. per cubic foot. For this application, nitrocellulose having about 12.6 to 13.4% nitrogen is preferably employed.

Several salient facts can be gleaned from the data presented in the examples, each of which is intended to illustrate the effect of one of the variables which are found to be critical in the formation of densified nitrocellulose by the process of this invention.

The mechanism of the process according to this invention is believed to involve simultaneous densification and controlled agglomeration of the nitrocellulose fibers into granules of the desired size. This agglomeration takes place during the period while the fibers are softened due to the action of the solvent. The factors involved are the amount of contact that can take place between particles and the degree of softening that is accomplished by the solvent. Thus, temperature is important as it effects the amount of softening which is accomplished by a given quantity of solvent, agitation and application of the protective colloid are important in determining the amount of intimate contact which can take place between softened particles.

From examination of the data in Example 1, it can be seen that the agitation of the particles affects not only the size and size range of the particles, but the shape and regularity of the shape of the particles. While the higher speed agitation, in most cases, produces particles, the bulk of which are within the desired particle size range, shear agitation produces particles within the narrowest size range which, in addition, are the most uniformly shaped. In the case of, e.g., a smokeless powder, this last aspect is believed to be significant, since it contributes to better control of the burning rate.

At lower agitation speeds, the shear agitation likewise produces better shaped, more uniformly sized particles than does the standard, paddle-type agitation when the densification is conducted at temperatures below the boiling point of the water-solvent azeotrope according to the process of this invention. These particles are spherical, having a relatively porous surface.

The temperature at which the densification is conducted and the presence or absence of the protective colloid are interrelated variables so far as the agglomeration of the particles is concerned. Generally speaking, higher temperatures promote agglomeration while the protective colloid inhibits agglomeration.

In the case—Examples 2, 3—where the temperature of the densification reaction is varied between 30 and 80° C., the best results are obtained at 30° C. when no protective colloid is used and at 50° C. when the protective colloid is present. Not only are the particles the most uniform in size at those points, they are also the most regular in shape. At the lower temperature, (30° C.) the tendency toward agglomeration is inhibited since the particles are softened less than at 50° C. When the protective colloid is used at 30° C., the bulk of the particles are too small for optimum use as smokeless powder, but are useful in other applications.

When densification takes place at 50° C. the best results are obtained when a protective colloid is used. Comparing the results of Examples 2 and 3, it can be seen that the overall range of particle size is narrower and the shape uniformity is greater. In the absence of the protective colloid, the particles are softened sufficiently at 50° C. that a substantial amount of agglomeration can take place. The occurrence of agglomeration is not uniform and the wider distribution of particle sizes results, as well as formation of somewhat larger particles. The inhibitive effect of the protective colloid, in helping to prevent or minimize agglomeration into large particles contributes to the lower overall particle size range as well as to the formation of lower average particle size.

It is also important that the protective colloid, when used, be added at the optimum point in the process. Referring to Example 4, it can be seen that, when the protective colloid is added before the addition of the nitrocellulose solvent has begun, the resultant particles are smaller than the optimum particle size desired for most satisfactory production of smokeless powder. The optimum condition occurs when the colloid is added after about one quarter of the nitrocellulose has been added. If the addition is delayed until after addition of one half or more of the solvent, the particle size range begins to increase beyond the optimum range. However, in any case where the colloid is added after addition of at least one quarter of the solvent, the resultant particles are useful in smokeless powder applications as contemplated.

As stated previously, and as shown by the examples, the amount of nitrocellulose solvent which is employed in the process of this invention is sufficient to soften the fibrous nitrocellulose without actually dissolving the same. In the softened state, the nitrocellulose loses its fibrous character, seeking the more spherical granular state. Any organic liquid solvent having active solvent power for nitrocellulose can be employed. The preferred solvents are those having an appreciable vapor pressure at or below the boiling point of water, which have limited solubility in water, and which form a minimum boiling azeotropic mixture with water. Suitable solvents include, by way of illustration but not limitation, ketones such as methyl ethyl ketone, methyl propyl ketone, methyl isobutyl ketone, methyl butyl ketone, and the like, and esters such as ethyl acetate, propyl acetate, butyl acetate, ethyl butyrate, isopropyl butyrate, ethyl propionate, β-ethoxyethyl acetate, and the like. Methyl isobutyl ketone and butyl acetate are preferred solvents.

The desired degree of densification of the fibrous nitrocellulose starting material is that amount which results in a product having a bulk density on the order of about 25 to 45 lbs. per cubic foot. Particles within this density range are usually found to be of relatively high porosity. In most applications, it is necessary to incorporate solvents, plasticizers, nitroglycerine or the like liquid additives into the particles. This porosity facilitates the incorporation of such additives. The solvent requirement to achieve this degree of densification will vary somewhat depending upon the slurry concentration, initial form of the nitrocellulose, temperature and the solvent. Usually, however, solvent is added to the nitrocellulose-water slurry in the ratio of about 1.50 to 1.90 parts solvent per part of nitrocellulose. The ratio of solvent to water depends generally upon the concentration of nitrocellulose in the slurry.

In practicing this invention, it has been found that softening of the fibers by the nitrocellulose solvent begins almost immediately upon contacting of the same by the active solvent. The solvent is added to slurry gradually over a period of time rather than all at one in order to distribute the same throughout the mass more uniformly and prevent the build up of an undesirably high concentration at the point of entry which would lead to a non-uniform action of the solvent throughout the bulk of the nitrocellulose. No substantial time interval need be provided following the addition of the last portion of the nitrocellulose solvent, prior to removal of the solvent. Thus, normally the solvent is removed immediately after the addition thereof, making the process a continuous operation. However, if conditions require, the solvent can be left in contact with the nitrocellulose for longer periods so long as the 20 to 50° C. temperature limitation is observed.

The boiling off of the nitrocellulose solvent results in hardening of the nitrocellulose particles, leaving relatively smooth, porous, spherical particles. The distillation is accomplished at that temperature at which water and the solvent form a constant boiling mixture. The distillation is continued until the temperature has risen to 100° C. and held there for about one-half hour to assure the removal of the last traces of solvent. The removal of the solvent can be accomplished in from about 20 minutes to about 4 hours. Normally it will be conducted over a period of about 3 hours as this has been found to contribute to regularity of shape in the particles.

When a protective colloid is employed, it is preferred to use one of the water-soluble protective colloids. This is added in the amount of about 0.1 to 5.0% based on the total weight of the slurry. Exemplary protective colloids that can be employed include carboxymethyl cellulose, hydroxyethyl cellulose and ethyl hydroxyethyl cellulose.

In the following example, there is demonstrated a continuous procedure for preparing smokeless powder employing the product prepared by the process of this invention.

*Example 5*

Nitrocellulose (fibrous—13.4% $N_2$) was densified substantially according to the procedure outlined in Example 1 using the Cowles high shear agitator at 3000 r.p.m. Two hundred and twenty (220) parts of nitrocellulose (13.4% $N_2$) dry basis, was slurried in 1900 parts water at 50° C. and treated with 418 parts methyl isobutyl ketone and 2.6 parts methyl cellulose. When all of the solvent had been removed the slurry was transferred to a second vessel.

In the second vessel, the slurry was agitated vigorously by sparging air therethrough. To the slurry was added 2 parts of diphenyl amine and 75 parts of nitroglycerin per part of nitrocellulose. The slurry was agitated 10 minutes after addition of the nitroglycerin.

The slurry was then filtered and the nitrocellulose granules washed with fresh water, then dried with hot air at 140° F.

Analysis of the resultant powder granules indicated that they contained about 25% nitroglycerin, and 1.2% diphenyl amine, based on the weight of the nitrocellulose. When this powder was loaded into 22 caliber rimfire cartridges the following ballistic properties were realized:

|  | Example 5 | Control* |
| --- | --- | --- |
| Powder charge weight, grains | 1.6 | 2.12 |
| Bullet velocity, ft./sec | 1,274 | 1,285 |
| Chamber pressure, p.s.i | 25,900 | 25,500 |

*Control powder was a standard commercial rimfire nitrocellulose/nitroglycerin smokeless powder.

In general the product can be used in any smokeless powder formulation utilizing approximately 5 to 40% nitroglycerin.

What I claim and desire to protect by Letters Patent is:
1. A process for preparing a densified nitrocellulose product which comprises:
   (a) forming a slurry of fibrous nitrocellulose in water,
   (b) subjecting the slurry to high shear agitation at a temperature of about 20 to 50° C.,
   (c) while continuing said high shear agitation at about 20 to 50° C., adding an active nitrocellulose solvent having limited solubility in water in amount to soften and swell the nitrocellulose fibers without dissolving the same; and (d) removing solvent by azeotropic distillation while continuing vigorous agitation.

2. The process of claim 1 where the nitrocellulose solvent is methyl isobutyl ketone.

3. The process of claim 1 where about 0.1 to 0.5% of a water-soluble protective colloid, based upon the weight of the slurry, is added to the slurry after the addition of at least about one quarter of the active nitrocellulose solvent.

4. The process of claim 3 where the protective colloid is methyl cellulose.

5. The process of claim 3 when steps (b) and (c) are conducted at about 50° C.

6. The process of claim 1 when applied to a nitrocellulose having about 12.6 to 13.4% nitrogen.

7. A process for producing a smokeless powder which comprises:
(a) forming a slurry of fibrous nitrocellulose in water,
(b) subjecting the slurry to high shear agitation at a temperature of about 20 to 50° C.,
(c) while continuing said high shear agitation at about 20 to 50° C., adding an active nitrocellulose solvent having limited solubility in water in amount to soften and swell the nitrocellulose fibers without dissolving the same;
(d) removing solvent by azeotropic distillation while continuing vigorous agitation,
(e) while agitating mildly, adding to the resultant water slurry of densified nitrocellulose particles, about 5 to 40% nitroglycerine, based on the weight of the slurry, and
(f) separating the resultant powder particles from the water and drying the same.

References Cited
UNITED STATES PATENTS

| | | | |
|---|---|---|---|
| 2,235,298 | 3/1941 | Olsen | 264—3 |
| 2,715,574 | 8/1955 | Cox | 264—3 |
| 2,885,736 | 5/1959 | O'Neill | 264—3 |
| 2,946,673 | 7/1960 | Grassie | 264—3 |
| 2,948,601 | 8/1960 | Grassie | 264—3 |
| 3,236,702 | 2/1966 | Sapiego | 149—96 |
| 3,284,253 | 11/1966 | Enders et al. | 264—3 |

L. DEWAYNE RUTLEDGE, *Primary Examiner.*